Patented Nov. 25, 1924.

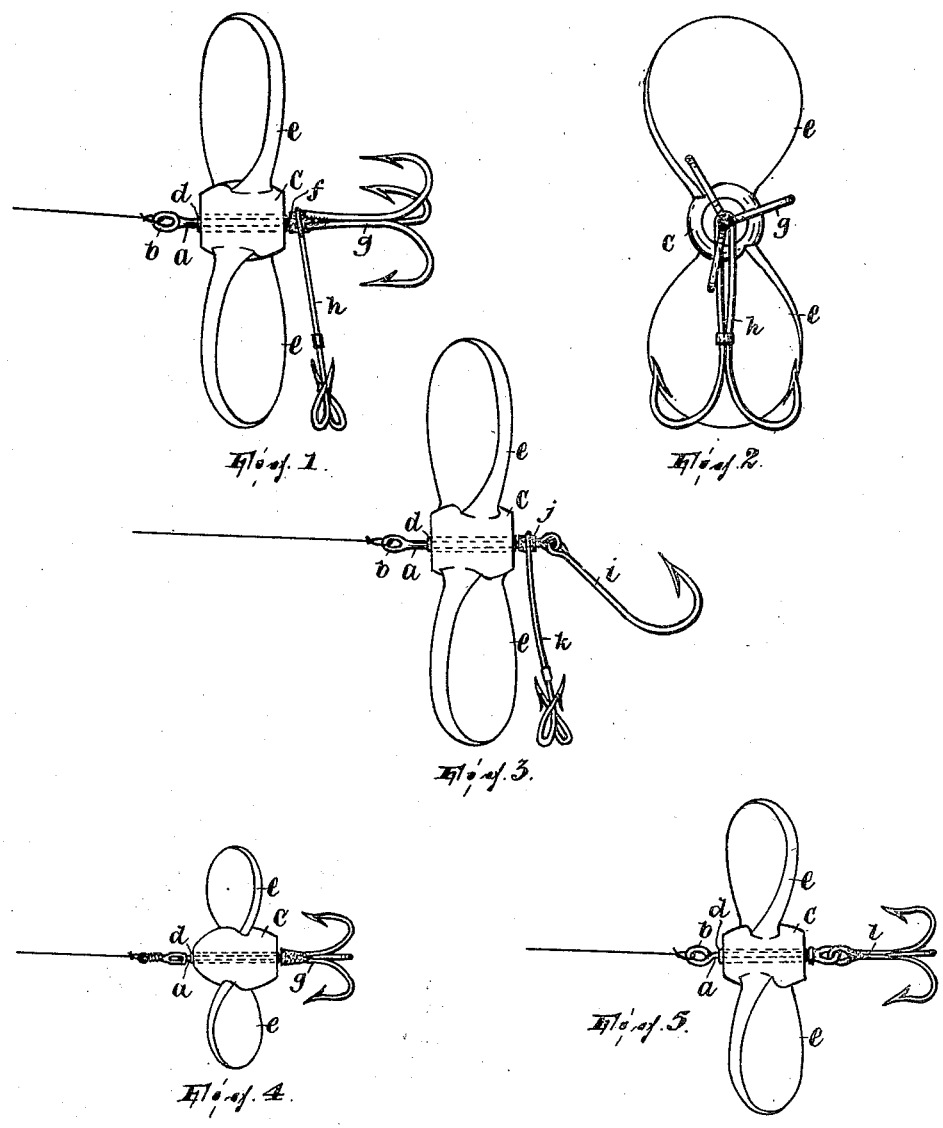

1,516,707

UNITED STATES PATENT OFFICE.

FRANK BROWN, OF PATERSON, NEW JERSEY.

FISH LURE.

Application filed August 18, 1923. Serial No. 658,036.

*To all whom it may concern:*

Be it known that I, FRANK BROWN, a citizen of the United States, residing at Paterson, in the county of Passaic and State of New Jersey, have invented certain new and useful Improvements in Fish Lures, of which the following is a specification.

In experimenting with fish lures I have found that a surface floating lure having a rotary element that produces splashings or flippings of the water when it rotates therein and having the dimension of its splashing medium lengthwise of the axis of rotation of said element not appreciably less than that of the lure as a whole lengthwise of said axis, so that the fish see the disturbance created in the water but are not able to detect what causes it, is most likely to induce the fish to "strike" at it. The object of this invention is therefore to provide a fish catching device which shall embody a lure of this description. The invention consists broadly in the combination of a surface floating lure including a rotary element having radial screw blades forming its rotating and agitating medium, the dimension of said medium lengthwise of the axis of rotation of said element being not appreciably less than that of the lure as a whole lengthwise of said axis, a journal member on which said element rotates adapted to be connected to a fish line at one side of said element, and a hook connected with said member at the other side of said element.

In the drawing,

Fig. 1 is a side elevation and Fig. 2 a rear view of one form of the invention; and Figs. 3, 4 and 5 are side elevations of other forms which the invention may take.

Referring, first, to Figs. 1 and 2: *a* designates a spindle forming the journal member and having an eye *b* at its forward end to which the line (which may be taken as including a leader) is attached, as shown.

On this spindle is the lure. This includes (complete in one part, in the present case) a body or central portion *c* having an axial bushing *d* journaled on the spindle and a plurality, as a pair, of radial equally spaced flat wings or blades *e* each formed like the blade or wing of a screw propeller, otherwise stated being what I term a "screw-blade" or "screw-wing". The body and wings are composed of some material which will float, as wood. The wings form, as will appear, the agitating element as well as the medium for causing rotation of the lure when there is relative movement between it and the water in which it floats, and it will be noted that the dimension of said element lengthwise of the spindle is not appreciably less than that of the lure as a whole lengthwise of said spindle, being in the present case in fact somewhat greater than the length of the body *c*.

On the rear end of the spindle in Figs. 1 and 2 is fixed a head or collar *f* to which is rigidly secured, as by soldering, the end of the shank of a three-member gang-hook *g*; another gang-hook *h*, having two members, may have the end of its shank also soldered to the collar *f* so that this gang-hook depends from the collar approximately vertically, being more or less close to the path of rotation of the lure wings *e*.

In Fig. 3 the construction is the same excepting that a single hook *i* is attached by a flexing joint to the rear end of the spindle itself and the collar, *j*, having a two-member gang-hook *k* rigidly secured thereto, is fixed on the spindle.

In Fig. 4 the construction is substantially the same as in Figs. 1 and 2 excepting that the gang-hook *h* is omitted.

In Fig. 5 a three-member gang-hook *l* is connected by a flexing joint to the rear end of the spindle.

The device may be used in trolling or casting or subject to any condition where there is a relative movement as between the device and the water, as when the former is pulled, as in casting or trolling, or is held stationary while the water moves, as in a stream. The device when in the water always floats at the surface and the relative movement between it and the water causes the rotary element to rotate on the spindle and so flip or splash the water and otherwise cause such a commotion as to attract fish and induce them to strike. As the dimension of the splashing medium formed by the screw-blades is not appreciably less lengthwise of the spindle than that of the lure as a whole practically all that the fish see is the splashing and commotion that are produced and that effectually conceal the form and nature of the lure, there appearing nothing of the lure that dispels the illusion of a live bait of some kind that is active in the water. The lure may be colored in any way to increase the illusion of a live bait.

Whenever, according to the kind of fishing for which the lure is used, a hook or hooks are employed auxiliary to the hooks shown as in the trailing relation (at *g*, *i* or *l* in the several figures of the drawing) it is best to arrange said auxiliary hooks so as to project radially from the spindle and behind and close to the splashing medium.

Having thus fully described my invention, what I claim as new and desire to secure by Letters Patent is:—

1. In combination, a surface floating lure including a rotary element having a body and flat radial screw blades projecting therefrom and each blade being large relatively to the body, the dimension of said element lengthwise of the axis of rotation thereof being not appreciably less than that of the lure as a whole lengthwise of said axis, a journal member on which said element rotates adapted to be connected to a fish line at one side of said element, and a hook connected with said member at the other side of said element.

2. In combination, a surface floating lure including a rotary element having a body and flat radial screw blades projecting therefrom and each blade being large relatively to the body, the dimension of said element lengthwise of the axis of rotation thereof being not appreciably less than that of the lure as a whole lengthwise of said axis, a journal member on which said element rotates adapted to be connected to a fish line at one side of said element, and a hook connected with and held in rigid radial relation to said member at the other side of said element and close thereto.

In testimony whereof I affix my signature.

FRANK BROWN.